US 6,715,930 B2

(12) United States Patent
McBride

(10) Patent No.: US 6,715,930 B2
(45) Date of Patent: Apr. 6, 2004

(54) OPTICAL FIBER SHUTTER ADAPTER WITH PROTECTIVE DOOR

(75) Inventor: Christopher J. McBride, Joliet, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/103,419

(22) Filed: Mar. 21, 2002

(65) Prior Publication Data
US 2003/0180005 A1 Sep. 25, 2003

(51) Int. Cl.$^7$ .................................................. G02B 6/38
(52) U.S. Cl. ............................................ 385/73; 385/77
(58) Field of Search ............................. 385/73, 72, 60, 385/77

(56) References Cited

U.S. PATENT DOCUMENTS

| 5,329,604 | A | * | 7/1994 | Baldwin et al. | ............... 385/92 |
| 5,570,445 | A | * | 10/1996 | Chou et al. | ................... 385/92 |
| 5,883,995 | A | * | 3/1999 | Lu | ............................... 385/60 |
| 5,915,058 | A | * | 6/1999 | Clairardin et al. | ............. 385/77 |
| 6,004,043 | A | * | 12/1999 | Abendschein et al. | ........ 385/76 |
| 6,179,477 | B1 | * | 1/2001 | De Marchi | ................... 385/56 |
| 6,425,694 | B1 | * | 7/2002 | Szilagyi et al. | ................ 385/76 |
| 6,471,412 | B1 | * | 10/2002 | Belenkiy et al. | ................ 385/53 |
| 2003/0063862 | A1 | * | 4/2003 | Fillion et al. | ................... 385/53 |

OTHER PUBLICATIONS website pp. from www.molex.com,(10 pages), (printed Jan. 16, 2002).

* cited by examiner

Primary Examiner—Hae Moon Hyeon

(57) ABSTRACT

An optical fiber shutter adapter including a housing having a bay and a bay opening for receiving a second connector. The optical fiber shutter adapter further includes a door disposed near the bay opening and having a blocking portion for blocking laser radiation from being emitted from the bay opening when the door is in a closed position. The door is connected to the housing for movement from the closed position to an open position for allowing the second connector to be received into the bay for connection to the shutter adapter. The blocking portion of the door moves into the adapter housing when the door is moved from the closed position towards the open position.

11 Claims, 2 Drawing Sheets

US 6,715,930 B2

OPTICAL FIBER SHUTTER ADAPTER WITH PROTECTIVE DOOR

BACKGROUND OF THE INVENTION

The present invention relates to a shutter adapter and more particularly to a fiber optic cable connector shutter adapter. It finds particular application in conjunction with components such as optical transceivers which are accessible though faceplates. However, it is to be appreciated that the present invention is also amenable to other applications.

Fiber optic components generate, transmit or otherwise manipulate laser light signals hereinafter referred to as fiber optic signals. Fiber optic cables transfer the fiber optic signals along optical fiber. Typically, fiber optic components and cables include connectors for joining with the connectors of other fiber optic components or cables. A variety of different connectors exist providing a plurality of different physical formats.

Adapters are intermediate devices which can be used to join the connectors of fiber optic cables and/or fiber optic components together. Adapters typically include one or more openings for receiving the connectors of the cables or components for connection to the shutter adapter. Some adapters can accommodate two or more connectors having different physical formats allowing them to be connected together.

Shutter adapters include doors which are movable between a closed position in which some or all of the shutter adapter opening is covered and an open position which allows a connector to be inserted into the opening for connection to the shutter adapter. In the closed position, the doors provide the safety feature of protecting the eyes of persons nearby by blocking the emission of laser radiation from the shutter adapter opening.

Known shutter adapter doors pull out and swing away from the shutter adapter. Doors which open outward can interfere with other connectors and adapters mounted nearby such as, for example, those mounted on a faceplate. It is desirable to have a shutter adapter which can be used in close proximity to other adapters, connectors or devices.

Often the shutter doors are urged back towards the closed position by either springs or gravity for added safety. Joining connectors to these known shutter adapters typically requires two hands, one used for opening the door and holding it open, the other used for inserting the connector into the shutter adapter. It is desirable to have a shutter adapter which allows for easier connection of connectors.

SUMMARY OF THE INVENTION

According to the present invention, a new and improved optical fiber shutter adapter is provided.

In accordance with one aspect of the present invention, the optical fiber shutter adapter includes a housing having a bay and a bay opening for receiving a second connector. The optical fiber shutter adapter further includes a door having a blocking portion for blocking laser radiation from being emitted from the bay opening when the door is in a closed position. The door is connected to the housing for movement from the closed position to an open position for allowing the second connector to be received into the bay for connection to the shutter adapter. The blocking portion of the door moves into the adapter housing when the door is moved from the closed position towards the open position.

In accordance with another aspect of the invention, the optical fiber shutter adapter includes a connector disposed at a second end of the shutter adapter opposite the bay opening. The connector includes a first end for connecting the shutter adapter to a third connector, such as a component connector.

In accordance with another aspect of the invention, the optical fiber shutter adapter includes an optical fiber extending from the first end of the connector to the bay for transferring signals from the component to the second connector.

The advantages and benefits of the present invention will become apparent to those of ordinary skill in the art upon reading and understanding the following detailed description of the preferred embodiments.

BRIEF DESCRIPTION OF THE DRAWINGS

The drawings are only for purposes of illustrating preferred embodiments and are not to be construed as limiting the invention. The invention may take form in various components and arrangements of components, and in various steps and arrangements of steps, preferred embodiments of which will be illustrated in the accompanying drawings wherein.

DETAILED DESCRIPTION OF THE INVENTION

It is to be understood that the specific devices and processes illustrated in the attached drawings, and described in the following specification are simply exemplary embodiments of the inventive concepts defined in the appended claims. Hence, specific examples and characteristics relating to the embodiments disclosed herein are not to be considered as limiting, unless the claims expressly state otherwise.

Figure 1:
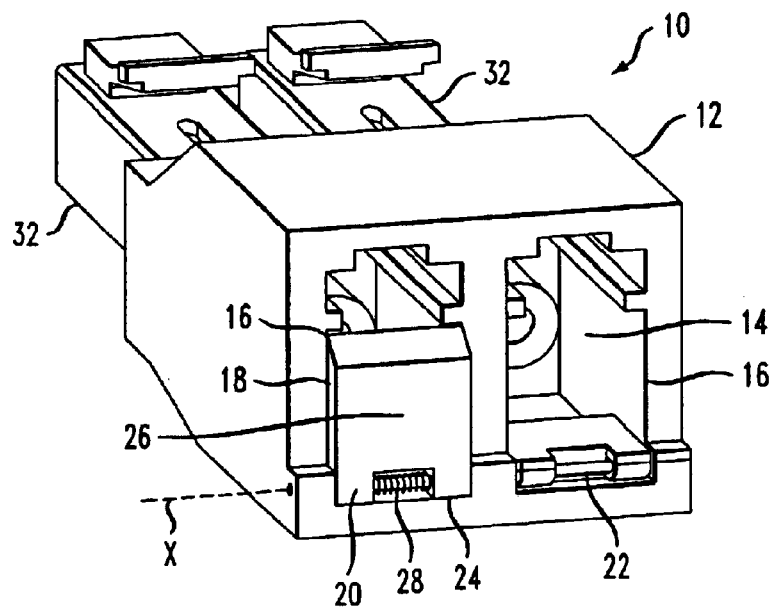
FIG. 1 is a perspective view of the optical fiber shutter adapter in accordance with the invention.
Figure 2:
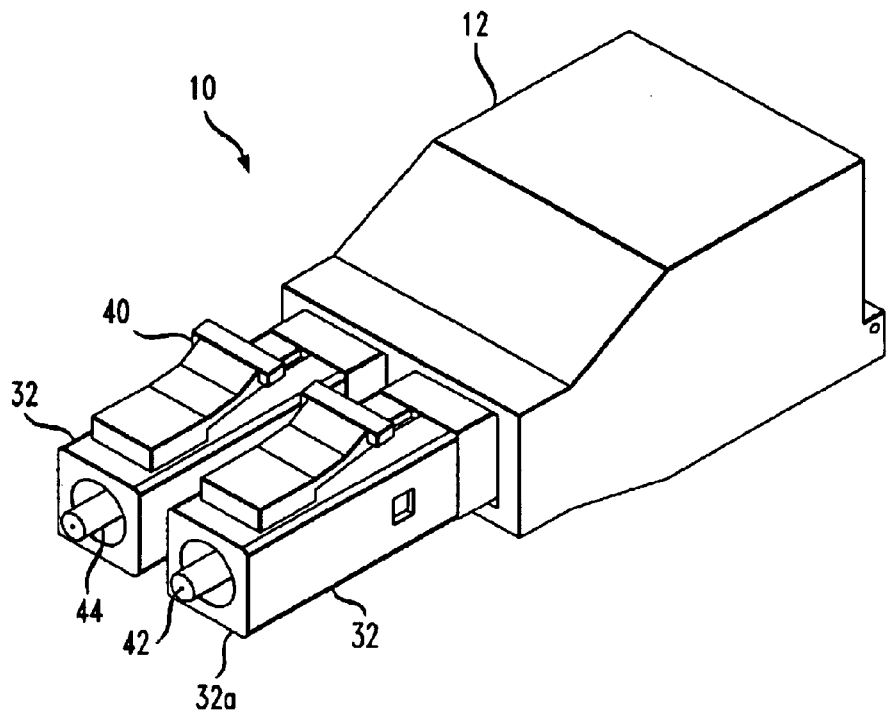
FIG. 2 is a perspective view of the optical fiber shutter adapter in accordance with the invention.
Figure 3:
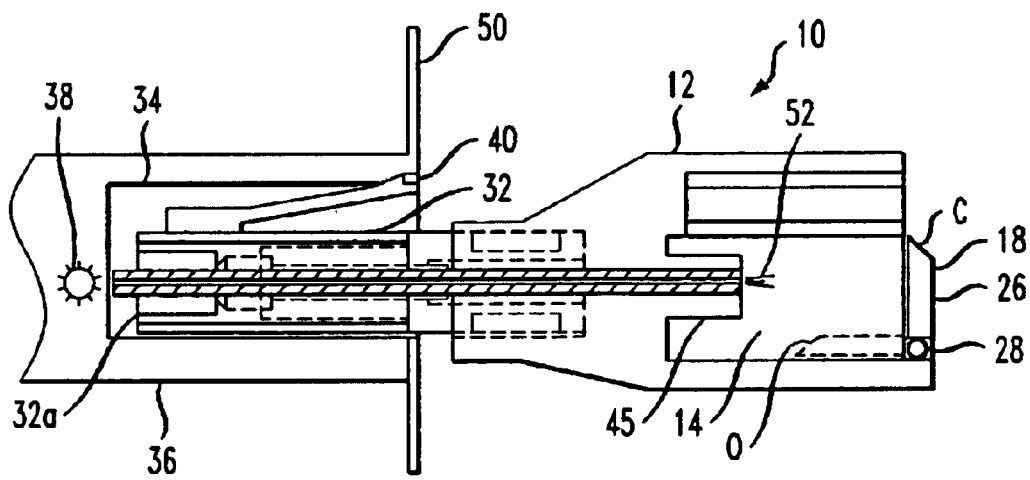
FIG. 3 is a partial sectional view of the optical fiber shutter adapter shown in FIG. 1.

Referring to FIGS. 1–3 a shutter adapter shown generally at 10 includes a housing 12. The housing 12 includes a bay 14 having an opening 16 for receiving a connector (shown generally at 17 in FIG. 4 and described in further detail below). The shutter adapter 10 shown is a duplex adapter having two sets of similar features for receiving two connectors 17. For simplicity, only one set of these features will be described in detail. Alternatively, the shutter adapter can be a simplex adapter for receiving one connector 17, or it can be adapted to receive any desired number of connectors.

The shutter adapter 10 includes a door 18 disposed near the bay opening 16. The door 18 is preferably connected to the shutter adapter housing 12 at a pivot connection 20. The pivot connection 20 allows for pivoting movement of the door 18 around a pivot axis shown at X. The pivot connection 20 can be formed by a pin 22 extending through a portion of the door 18, or alternatively it can be formed in any other known manner. The pivot axis X preferably extends adjacent an edge of the door 18, such as the bottom edge 24 as shown in FIG. 1. Alternatively it can extend adjacent the top edge, or the left or right edge of the door 18.

The door pivots on the axis X between a closed position shown at C and an open position shown in phantom at O. In the closed position, the blocking portion 26 of the door 18 blocks at least part of the bay opening 16 to block at least a substantial amount of laser radiation emitted from the bay 14 out of the housing 12 through the bay opening 16 as described below. The door 18 includes a blocking portion 26 formed of a any known material which substantially blocks laser radiation including but not limited to any suitable known plastic.

The shutter adapter 10 can include a spring 28 connected to the door 18 for urging the door towards the closed position C. The spring 28 can be a coiled spring coiled along the axis X and formed of a known material, although alternatively any known spring for urging the door towards the closed position C can be used. Further, gravity can be used to urge the door 18 towards the closed position using any known means, such as for example, by forming the pivot connection 20 at the top edge of the door 18.

The adapter 10 further includes a connector 32 disposed at an opposite end of the housing 12 from the bay opening 16. The connector 32 can be a male connector for connecting to a female connector, or alternatively, it can be a female connector. The connector 32 can have any known physical format including but not limited to known LC, SC, SC Duplex, or MTRJ formats.

The connector 32 includes a first end 32a for connecting with the connector 34 of another component 36. The component 36 can be any known component for use with optical fibers including but not limited to an optical transceiver shown in FIG. 2. The optical transceiver 36 typically includes a laser radiation emitter 38. The connector 32 can also include a retainer 40 for releasably securing the connector 32 to the connector 34 of the other component 36. The retainer 40 can be an RJ 45 style latch or any other known retainer for providing a releasable connection when fully engaged. An optional tool (not shown) may be needed to unlatch the retainer 40 when removing the connector 32 from the component 36.

The shutter adapter 10 also includes an optical fiber 42 for transmitting signals through the shutter adapter 10. The optical fiber 42 extends from the first end of the connector 32a to the bay 14 for transmitting signals from the component 36 to the connector 17 received in the 14. A shroud 44 surrounds the optical fiber 42, preferably extending the entire length of the fiber. The shroud 44 can be formed ceramic material, or any other suitable known material. The adapter can include a ferrule 45 surrounding the shroud 44 and fiber 42 for properly positioning the fiber in the bay 14 for connection to the connector 17 as described below.

Referring to FIG. 3 the shutter adapter 10 is shown connected to an optical transceiver 36 having a laser radiation emitter 38. Such a connection configuration might commonly be used on the face plate 50 of a circuit pack which is plugged into the frame of a router such as a TMX 80 terabit router (not shown). When the shutter adapter 10 is connected to a component 36, laser radiation is transferred from the component 36 through the optical fiber 42 to the bay 14 as shown at 52. With no connector 17 inserted into the adapter bay 14, the door 18 is disposed in the closed position C. In the closed position C, the blocking portion 26 of the door 18 blocks most of the collimated laser radiation 52 from exiting the housing 12 through the bay opening 16, thereby preventing it from harming a person's eyes.

Figure 4:
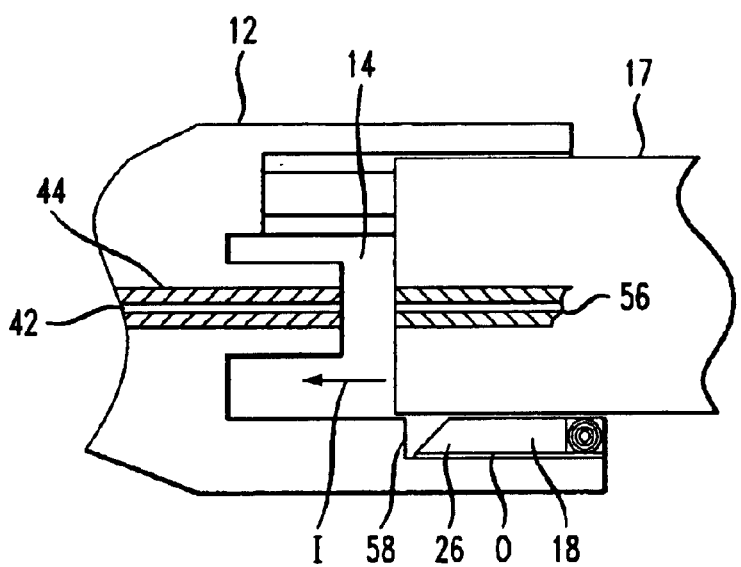
FIG. 4 is a partial sectional view of the optical fiber shutter adapter receiving a second connector in accordance with the invention.

Referring now to FIGS. 3 and 4, the shutter adapter bay 14 and bay opening 16 are formed to receive a connector 17 having any suitable known physical format including but not limited to LC, SC, SC Duplex, or MTRJ formats. The connector 17 includes an optical fiber 56 disposed in a manner so as to coaxially align with the fiber 42 when the connector is inserted into the bay 14 for receiving signals from the component 36.

The connector 17 can be connected to the shutter adapter 10, and thus to the component 36, by inserting the connector 17 through the bay opening 16 and into the bay 14 as shown by the arrow I in FIG. 4. During insertion, the connector 17 pushes against the door 18, moving the door from the closed position C to the open position O. As the door is moved towards the open position O, it pivots on the pivot axis X and the blocking portion 26 swings into the adapter housing 12 making way for the connector 17 to be received in the bay 14. The shutter adapter 10 provides a safe operating environment by blocking laser radiation 52 from being emitted from the housing 12 by having the door 18 disposed in the closed position C when a connector 17 is not connected. The shutter adapter 10 also provides for simple, one-handed connection of a connector 17 with a component 36 using a door 18 with a blocking portion 26 that swings into the adapter housing 12 when the connector 17 is connected.

The shutter adapter 10 can include an optional recess 58 formed in the bay 14 for receiving the door 18 as it is moved into the open position O as shown in FIG. 4. The connector 17 is inserted into the shutter adapter until it is completely received in a fully engaged position such that the optical fiber 56 is disposed adjacent the shutter optical fiber 42 for low insertion loss. The connecter 17 can be latched in place in the fully engaged position by any known retainer (not shown).

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

I claim:

1. An optical fiber shutter adapter comprising:
    a housing having a bay and a bay opening disposed at a fist end of the shutter adapter for receiving a second connector;
    a door having a blocking portion, said door connected to said housing for movement between a closed position for blocking at least some of said bay opening with said blocking portion and an open position for allowing said connector to be received into said bay for connection to the shutter adapter, wherein said blocking portion moves into said housing when said door is moved from said closed position towards said open position
    a first connector disposed at a second end of the shutter adapter, said first connector having a first end for connecting to a third connector; and
    an optical fiber extending from said first end of said first connector to said bay.

2. The optical fiber shutter adapter defined in claim 1 wherein said door is connected to said housing at a pivot connection for pivoting movement along a pivot axis and said blocking portion swings into said bay when said door is moved towards said open position.

3. The optical fiber shutter adapter defined in claim 2 wherein said pivot connection is disposed adjacent an edge of said door.

4. The optical fiber shutter adapter defined in claim 3 wherein said pivot connection is disposed adjacent the bottom edge of said door.

5. The optical fiber shutter adapter defined in claim 2 further comprising a recess formed in said bay for receiving said blocking portion when said door is in said open position.

6. The optical fiber shutter adapter defined in claim 1 further comprising a retainer disposed on said first connector for releasably securing the shutter adapter to said third connector.

7. The optical fiber shutter adapter defined in claim 1 further comprising a shroud covering said optical fiber and extending along the length of said optical fiber.

8. The optical fiber shutter adapter defined in claim 6 wherein said first connector is a male connector for connecting the shutter adapter to an optical transceiver and said door blocks laser radiation emitted by said optical transceiver when in said closed position.

9. An optical fiber shutter adapter comprising:

a housing having a bay and a bay opening disposed at a first end of the shutter adapter for receiving a second connector into said bay for connection to the shutter adapter;

a first connector disposed at a second end of the shutter adapter, said first connector having a first end for connecting to a third connector;

an optical fiber extending from said first end of said connector to said bay; and a door having a blocking portion, said door connected to the first end of the shutter adapter for movement between a closed position for blocking at least some of said bay opening with said blocking portion and an open position for allowing said second connector to be received into said bay for connection to the shutter adapter, wherein said blocking portion moves into said bay when said door is moved from said closed position towards said open position.

10. The optical fiber shutter adapter defined in claim 9 wherein said first connector is a male connector for connecting the shutter adapter to a component and said blocking portion of said door blocks laser radiation from said component when said door is in said closed position.

11. The optical fiber shutter adapter defined in claim 10 wherein said component is an optical transceiver.

* * * * *